United States Patent [19]
Baynes

[11] 3,829,259
[45] Aug. 13, 1974

[54] COMBINATION APEX AND CORNER SEAL SPRING FOR ROTARY ENGINE

[75] Inventor: Gene P. Baynes, Kettering, Ohio

[73] Assignee: General Motors Corporation, Detroit, Mich.

[22] Filed: June 21, 1973

[21] Appl. No.: 371,976

[52] U.S. Cl. .............................................. 418/121
[51] Int. Cl. ........................................... F01c 19/04
[58] Field of Search .......... 418/121, 122, 123, 142, 418/61 A

[56] References Cited
UNITED STATES PATENTS
3,556,695  1/1971  Yamamoto ..................... 418/121 X
3,761,207  9/1973  Seidl ................................ 418/121

FOREIGN PATENTS OR APPLICATIONS
1,116,951  11/1961  Germany ........................... 418/122
1,245,636  7/1967  Germany ........................... 418/121

Primary Examiner—C. J. Husar
Assistant Examiner—Leonard Smith
Attorney, Agent, or Firm—Ronald L. Phillips

[57] ABSTRACT

A single spring biases both a two-piece apex seal and two corner seals at each corner of a rotor in a rotary combustion engine so that the apex seal continuously engages the engine's inwardly facing peripheral wall and the corner seals continuously engage the engine's oppositely facing end walls.

3 Claims, 4 Drawing Figures

PATENTED AUG 13 1974 3,829,259

COMBINATION APEX AND CORNER SEAL SPRING FOR ROTARY ENGINE

This invention relates to biasing both a multi-piece apex seal and two corner seals at each corner of a rotor in a rotary engine and more particularly to a single spring providing such bias.

In some current production rotary combustion engines there is provided a multi-piece apex seal and two corner seals at each corner of the engine's rotor with a leaf spring biasing each of the apex seals to engage the engine's inwardly facing internal peripheral wall and separate U-shaped leaf or wire springs biasing the corner seals to engage the engine's oppositely facing inner end walls as the rotor turns. In the current production rotary combustion engine which has a three-corner rotor that operates within a two-lobed inwardly facing peripheral wall, nine springs are thus required to effect the necessary bias of the apex seals and corner seals.

An object of the present invention is to reduce the number of springs required to bias the multi-piece apex seals and corner seals in a current production rotary type combustion engine.

Another object is to provide in a rotary combustion engine having a rotor with a multi-piece apex seal and two corner seals at each corner thereof, a single leaf spring that is operable to bias the apex seal while also biasing the two corner seals associated therewith.

Another object is to provide in a rotary engine having a rotor with a multi-piece apex seal and two corner seals at each corner, a leaf spring that has opposite end portions which each engage the apex seal and one of the corner seals.

These and other objects of the present invention will become more apparent with reference to the following description and drawing in which.

Figure 1:
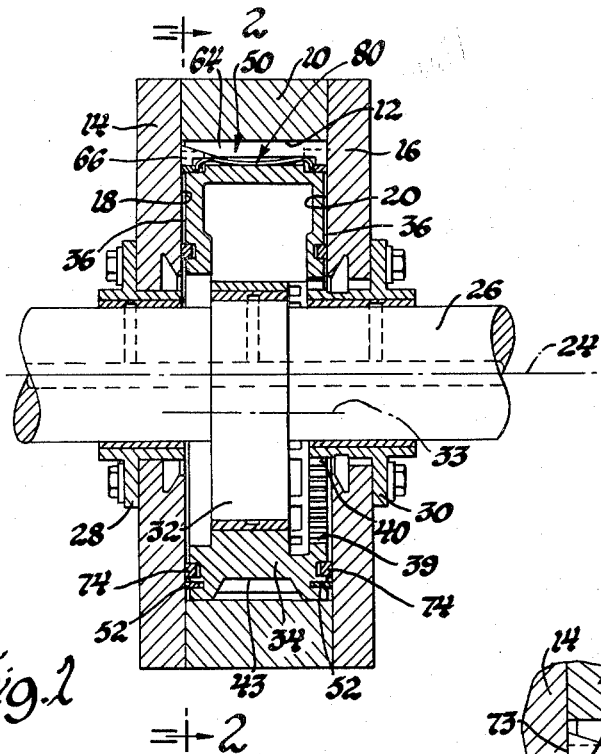
FIG. 1 is a longitudinal view with parts in section of a rotary combustion engine having apex and corner seal spring arrangements according to the present invention.
Figure 2:
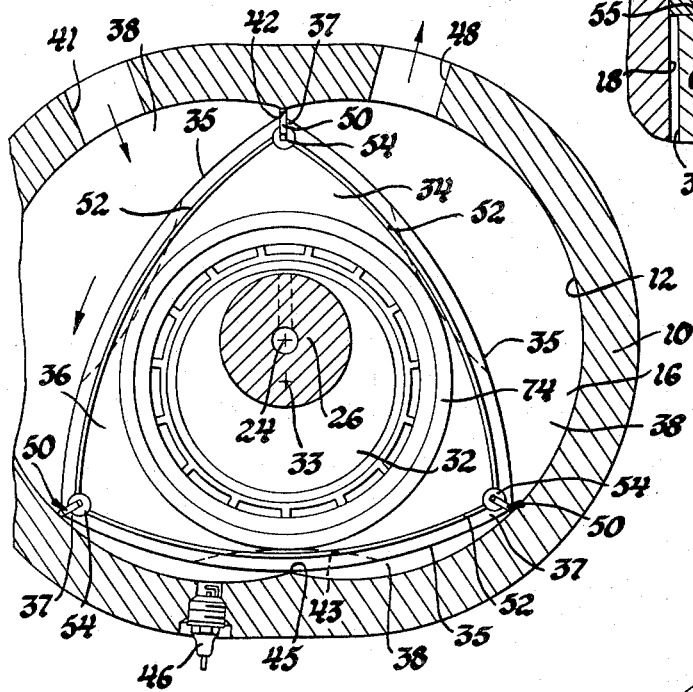
FIG. 2 is a view of the engine taken along the line 2—2 in FIG. 1.

The combination apex and corner seal spring according to the present invention is for use in rotary engines including rotary combustion engines, compressors, pumps and the like. Referring to FIG. 1, the rotary engine may, for example, be an internal combustion engine of current production type having a stationary outer body comprising a rotor housing 10 having an inwardly facing inner peripheral wall 12 and a pair of end housings 14 and 16 having parallel, oppositely facing, spaced, inner end walls 18 and 20, respectively. The housing parts are rigidly secured together by bolts, not shown, with the inner walls 12, 18 and 20 cooperatively providing a cavity. Referring to FIG. 2, the peripheral wall 12 is in the shape of a two-lobed epitrochoid or a curve parallel thereto whose center line is indicated at 24. A rotor shaft 26 extends through the cavity and is rotatably supported in bearing lined collars 28 and 30 that are bolted to the end housings 14 and 16, respectively, as shown in FIG. 1; the rotor shaft axis being coincident with the center line 24, parallel to the peripheral wall 12 and perpendicular to the end walls 18 and 20. The rotor shaft 26 is provided in the cavity with an eccentric 32 whose center line 33 parallels the rotor shaft axis 24. A rotor 34 has a central hub having a bearing press-fitted therein which is received on the eccentric 32 whereby the rotor 34 is supported for rotation about the eccentric's center line 33 which is thus the rotor's axis. The rotor 34 has the general shape of a triangle with three outwardly facing convex peripheral flanks or faces 35 which face the peripheral wall 12 and sides 36 which face the end walls 18 and 20 and as the rotor turns with respect to the peripheral wall 12 on the turning rotor shaft 26 as will be described in more detail later, each of the rotor's corners 37 remains close to the peripheral wall 12 whereby the rotor faces 36 cooperate with the wall 12 and also with the end walls 18 and 20 to define three variable volume working chambers 38 that are spaced around the rotor and move with the rotor within the housing as the rotor rotates about its axis while planetating with respect to the rotor shaft axis.

With the two-lobed peripheral wall 12 and the three corner rotor 34, each of the working chambers 38 sequentially expands and contracts between minimum and maximum volume during each rotor revolution in fixed relation to the housing by forcing the rotor to rotate at one-third the speed of the rotor shaft. This is accomplished by gearing comprising an internal tooth gear 39 which is concentric and integral with rotor 34. The gear 39 meshes with an external tooth gear 40 which is received with clearance about and is concentric with the rotor shaft 26 and is made stationary by being formed integral with the right-hand collar 30 as shown in FIG. 1. The gear 39 has one and one-half times the number of teeth as the gear 40 to provide the required speed ratio of 3:1 between the rotor shaft and rotor.

A combustible air-fuel mixture from a suitable carburetor arrangement, not shown, is made available to working chambers 38 by an intake port 41 in rotor housing 10 as shown in FIG. 2. Passage 41 opens to the cavity on the leading side of cusp 42 of the peripheral wall 12 relative to the direction of rotor rotation indicated by the arrow in FIG. 2. A single channel or recess 43 is provided for the transfer of working gases past the peripheral wall's other cusp 45 when a rotor face is at or near its top-dead-center position, as shown in FIG. 2, so that the chambers are not divided by the cusp 45 at the time when combustion is to occur therein. A spark plug 46 is mounted in the rotor housing 10 adjacent the cusp 45 with its electrodes exposed to the working chambers. As the rotor planetates, the working chambers successively draw in fuel mixture as the leading rotor corners pass the intake port 41. The trailing corner of the rotor for each chamber then closes this chamber to the intake port whereafter the fuel mixture is thus trapped and then compressed and when the rotor face of this chamber is in the vicinity of top-dead-center, this mixture is ignited at the completion of the compression phase; there being provided a suitable ignition system, not shown, for providing voltage to the spark plug at the proper time. Upon ignition of the mixture in each working chamber the peripheral wall takes the reaction forcing the rotor to continue turning while the gas is expanding. The leading rotor corner of each working chamber eventually traverses an exhaust port 48 in the rotor housing on the trailing side of the cusp 42 whereby the exhaust products are then expelled to complete the cycle.

Sealing of the chambers 38 for such 4-cycle internal combustion engine operation is mandatory and is provided by a gas seal arrangement which typically comprises three apex seals 50 that are urged to engage peripheral wall 12. The apex seals 50 are rectangularly shaped in cross-section and are each mounted in an axially extending radially outwardly facing rectangularly shaped groove 51 that is located at each apex or corner 37 of the rotor and extends the axial width thereof. Three arcuate shaped side seals 52 are mounted in accommodating axially outwardly facing grooves in each rotor side 36 and extend adjacent a rotor face between two apex seals 50 and are urged to engage the opposing end wall. Furthermore, three cylindrically shaped corner seals 54 are each mounted in a cylindrical hole 55 in each rotor side with each corner seal urged to engage the opposing end wall and providing sealing between the adjacent ends of two side seals and one apex seal as shown in FIG. 2. For very tight sealing, the apex seals 50 are of the multi-piece type such as the two-piece construction shown in FIG. 3 which comprises a main piece 64 and a single end piece 66. The main piece 64 has a rounded edge along its entire length that extends almost the width of and engages the peripheral wall 12. The apex pieces 64 and 66 have ramps 68 and 69 that are inclined to the radial direction so that on application of radial forces to their respective bottoms 70 and 71, these ramps force the main piece in the radially outward direction against the peripheral wall 12 while also forcing both apex seal pieces axially outward to engage their respective flat ends 72 and 73 with the end walls 20 and 18. In addition to this gas sealing arrangement there is also provided radially inward thereof a circular oil seal 74 that is mounted in an accommodating axially outwardly facing groove in each rotor side and is urged to engage the opposing end wall.

Figure 3:
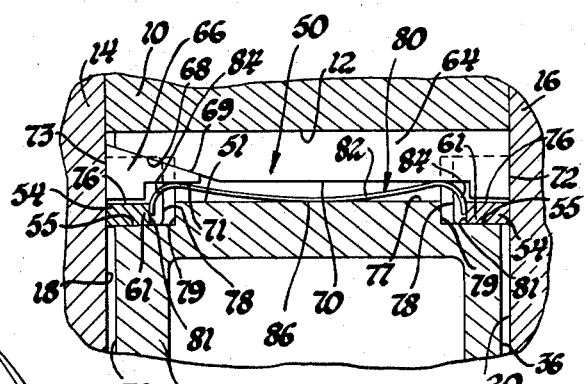
FIG. 3 is an enlarged view of one corner of the rotor in FIG. 1.

In the gas sealing arrangement at each corner of the rotor as best shown in FIG. 3, the two corner seal accommodating holes 55 are axially aligned with each other and are centered and join with the apex seal groove 51. Furthermore, each of the corner seals 54 has a rectangularly shaped radially outwardly facing slot 76 which closely receives one end of the associated multi-piece apex seal 50 to permit sliding movement therebetween while maintaining sealing therebetween. Typically, each of the multi-piece apex seals 50 would be biased by a leaf spring fitting between the bottoms 70 and 71 thereof and the flat bottom 77 of the apex seal groove 51 while the corner seals 54 would be biased to continuously engage the respective end walls 18 and 20 by separate U-shaped springs located between the flat inner end 78 of the corner seals 54 and the flat bottom 79 of the accommodating corner seal holes 55. It will also be understood that suitable spring means such as wave springs would be provided to bias the side seals 52 and oil seals 74 against the end walls.

Figure 4:
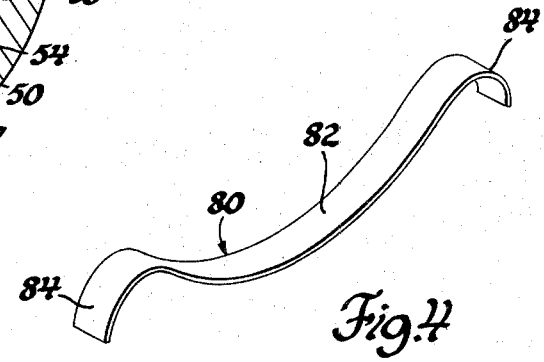
FIG. 4 is an enlarged perspective view of the seal spring according to the present invention.

According to the present invention there is provided, instead of three springs for each arrangement of a multi-piece apex seal and two corner seals, a single leaf spring 80 of suitable material such as stainless steel that as best shown in FIG. 3 fits within the already available space between the bottoms 70 and 71 of the multi-piece apex seal 50 and the bottom 77 of the apex seal groove 51 and in a radial slot 81 formed in each inner end 61 of the associated pair of corner seals 54 opposite the bottom 79 of their accommodating holes 55. As shown in FIG. 4 in an unloaded condition, the combination apex and corner seal spring 80 has a rectangular cross-section and is formed so that it has an elongated radially outwardly facing concave portion 82 intermediate two axially outwardly facing short convex end portions 84 with gentle transitions therebetween. The length of the intermediate portion 82 with its single arcuate curve is substantially that of the apex seal groove bottom 77 and the height of the end portions 84 with their single arcuate curve is less than the distance between the apex seal groove bottom 77 and the cylindrical wall of corner seal holes 55 so that the spring 80 is positionable as shown in FIG. 3 with the center 86 of its inner side seated on the center of the apex seal groove bottom 77 and the end portions 84 received in the corner seal slots 81 and with clearance relative to the walls of the corner seal holes 55. The left-hand end portion 84 near the left-hand end of intermediate spring portion 82 engages on its outer side with the bottom 71 of the apex seal's end piece 66 and the right-hand end portion 84 near the right-hand end of the intermediate portion engages on its outer side with the bottom 70 of the apex seal's main piece 64 to thus provide the required apex seal bias through the spring action of the intermediate portion while the end portions 84 which are also located in the corner seal holes 55 engage on their outer side with the radially projecting bottoms of the slots 81 in the inner ends 78 of the corner seals 54 to bias the corner seals in directions perpendicular to the apex seals and outwardly against the end walls 18 and 20. In this spring force system the reaction for the multi-piece apex seal bias is thus taken at the center of the spring 80 where it seats on its radially inner spring side with the apex seal groove bottom 77 while the reaction for the corner seal bias results from the trapping of the spring by these corner seals. Typically, the spring force required to bias the apex seal is substantially greater than that required for the corner seals. This difference in spring force requirements is met by the present invention in that the spring 80 takes apex seal movement in compression in the elongated intermediate spring portion 82 and takes corner seal movement in tension with bending of the end spring portions 84 about the center spring seat. Thus, spring 80 is stiffer in the radial direction than in the axial direction and is readily tailored to specific requirements, observing that this difference in stiffness increases as the effective length of the center spring portion 82 is reduced and the effective lengths of the end portions 84 are increased.

Thus, the combination apex seal and corner seal spring according to the present invention provides the same seal biasing effects heretofore performed by three separate springs and therefore greatly reduces the number of parts required in a rotary engine that is already credited with having very few parts. Furthermore, the present seal spring in addition to reducing manufacturing costs also has the added advantage of reducing spring assembly time and in making assembly easier as compared with the proper positioning of several different springs. It will also be appreciated by those skilled in this art that the present seal will work equally as well in biasing a three-piece seal having a main piece that engages the peripheral wall and two end pieces which engage the opposite end walls with the spring bias then applied directly to both these end pieces which then by operation of their ramped engagement with the main piece force the main piece in the required radial direction while they are forced thereby in the required axial directions.

The above described embodiments are illustrative of the invention which may be modified within the scope of the appended claims.

I claim:

1. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal groove extending thereacross facing outwardly toward said peripheral wall and also having a corner seal hole in each said rotor side joining with said apex seal groove and facing outwardly toward one of said end walls, a multi-piece apex seal mounted in said apex seal groove comprising a main piece and at least one end piece, said apex seal pieces having engaged ramps that operate when radial forces are applied to said pieces to force said main piece to engage said peripheral wall and said end piece to engage one of said end walls, a corner seal mounted in each said corner seal hole for engaging the opposite end wall, each said corner seal having a slot receiving one end of said multi-piece apex seal, said apex seal pieces and said apex seal groove having opposed bottoms with an apex seal spring space therebetween, said corner seals and said corner seal holes having opposed bottoms with corner seal spring spaces therebetween open to the opposite ends of said apex seal spring space, a single spring located in said spaces, said spring having two end portions and an intermediate portion of substantially greater length with each said portion having a single curve, said intermediate portion arranged in said apex seal spring space and seating on a radially inner side at only a center location on said apex seal groove bottom, said end portions engaging on a radially outer side with said bottoms of said apex seal pieces to bias said main piece against said peripheral wall and said one piece against said one end wall, and said end portions also extending into said corner seal spring spaces and engaging said bottoms of said corner seals to bias said corner seals outwardly against said end walls.

2. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal groove extending thereacross facing outwardly toward said peripheral wall and also having a corner seal hole in each said rotor side joining with said apex seal groove and facing outwardly toward one of said end walls, a multi-piece apex seal mounted in said apex seal groove comprising a main piece and at least one end piece, said apex seal pieces having engaged ramps that operate when radial forces are applied to said pieces to force said main piece to engage said peripheral wall and said end piece to engage one of said end walls, a corner seal mounted in each said corner seal hole for engaging the opposite end wall, each said corner seal having a slot receiving one end of said multi-piece apex seal, said apex seal pieces and said apex seal groove having opposed bottoms with an apex seal spring space therebetween, said corner seals and said corner seal holes having bottoms with corner seal spring spaces therebetween open to the opposite ends of said apex seal spring space, a single leaf spring located in said spaces, said leaf spring having two end portions of the same length and an intermediate portion of substantially greater length with each said portion having an arcuate shape, said intermediate portion arranged in said apex seal spring space with a single centrally located seat portion seating on said apex seal groove bottom, said end portions engaging said bottoms of said apex seal pieces at equal distances from said seat portion to bias said main piece outwardly against said peripheral wall and said end piece against said one end wall, and said end portions also extending into said corner seal spring spaces and engaging said bottoms of said corner seals to bias said corner seals outwardly against said end walls.

3. In a rotary machine, a housing having an inwardly facing inner peripheral wall and a pair of spaced oppositely facing inner end walls, a rotor rotatably mounted in said housing having sides opposite said end walls and a plurality of corners that remain adjacent said peripheral wall as said rotor rotates, said rotor and said housing walls cooperatively defining a plurality of chambers separated by said rotor corners that expand and contract as said rotor rotates, each said rotor corner having an apex seal groove extending thereacross facing outwardly toward said peripheral wall and also having a corner seal hole in each said rotor side joining with said apex seal groove and facing outwardly toward one of said end walls, a multi-piece apex seal mounted in said apex seal groove comprising a main piece and at least one end piece, said apex seal pieces having engaged ramps that operate when radial forces are applied to said pieces to force said main piece to engage said peripheral wall and said end piece to engage one of said end walls, a corner seal mounted in each said corner seal hole for engaging the opposite end wall, each said corner seal having a slot receiving one end of said multi-piece apex seal, said apex seal pieces and said apex seal groove having opposed bottoms with an apex seal spring space therebetween, said corner seals and said corner seal holes having opposed bottoms, the bottom of each said corner seal having a slot, the bottoms of said corner seals and said corner seal holes having corner seal spring spaces therebetween open to the opposite ends of said apex seal spring space, a single leaf spring located in said spaces, said leaf spring having two end portions of the same length having a radially outwardly facing convex curve and an intermediate portion of substantially greater length having a radially outwardly facing concave curve with a single centrally located seat portion seating on the radially inwardly facing side on said apex seal groove bottom, said end portions on a radially outwardly facing side adjacent the ends of said intermediate portion engaging said bottoms of said apex seal pieces at equal distances from said seat portion so that said intermediate portion biases said main piece against said peripheral wall and said end piece against said one end wall, and said end portions also extending into said corner seal spring spaces and into said corner seal slots to engage said bottoms of said corner seals to bias said corner seals outwardly against said end walls whereby said leaf spring flexes in said intermediate portion between said end portions to take apex seal movement in compression and said end portions bend about said spring seat portion to take corner seal movement in tension to effect a spring bias on said multi-piece apex seal greater than that on said corner seals.

* * * * *